Nov. 24, 1970 D. F. MITCHELL ET AL 3,542,957

MULTIPLEX ARRANGEMENT FOR PULSE CODE MODULATED SIGNALLING SYSTEM

Filed Oct. 25, 1968 2 Sheets-Sheet 1

INVENTORS
DONALD F MITCHELL
RICHARD SCOTT

BY Hoffman Stone

ATTORNEY

INVENTORS
DONALD F. MITCHELL
RICHARD SCOTT
BY
Hoffman Stone
ATTORNEY

United States Patent Office 3,542,957
Patented Nov. 24, 1970

3,542,957
MULTIPLEX ARRANGEMENT FOR PULSE CODE MODULATED SIGNALLING SYSTEM

Donald F. Mitchell, Webster, and Richard Scott, Fairport, N.Y., assignors to Stromberg-Carlson Corporation, Rochester, N.Y., a corporation of New York Filed Oct. 25, 1968, Ser. No. 770,731
Int. Cl. H04j 3/16
U.S. Cl. 179—15 1 Claim

ABSTRACT OF THE DISCLOSURE

A speech-plus-data multiplexing scheme for pulse code modulated signalling systems of the T-Carrier type in which the pulse train consists of successive groups of time slots, each group including a selected number of time slots used to carry speech information and an additional time slot to carry supervisory signals to control central office switching equipment. The additional time slot in any or all of the channels is time-shared between the supervisory signal and data signals.

BRIEF SUMMARY

This invention relates to a novel multiplexing scheme for the simultaneous transmission of voice signals and telegraph or data signals in conventional pulse code modulated signalling systems of the general type exemplified by T-Carrier telephone transmission systems.

Pulse code modulated signalling systems are coming into fairly wide use in the telephone industry. A typical system of this type is known as T-Carrier, and is arranged to transmit signals in the form of a train of electrical pulses of uniform amplitude and extremely brief duration. One T-Carrier system is arranged according to a time frame having a duration of 125 microseconds (8 kHz. repetition rate) and including 193 time slots, or separately identifiable intervals. The time frame is divided into twenty-four channels of eight time slots each, and includes one additional time slot for transmitting a synchronizing signal. Seven of the time slots in each channel are used to carry signals representing the speech or voice to be transmitted by telephone. The eighth time slot in each channel is used to carry supervisory information, which ordinarily signifies the instantaneous condition of the subscriber's hook switch. The eighth time slot is commonly referred to as the signalling time slot, or, sometimes, as the signalling bit.

Briefly, the invention contemplates taking advantage of the redundancy of the signalling time slots in one or more of the channels. In most cases, the signalling infomation consists either of a steady state signal, or of an on-off signal which changes at most twenty times per second. About ten pulses per second is the maximum rate of transmission of telephone dialling pulses, and twenty changes per second are all that need be detected at the receiver to provide full dialling information there. In the T-Carrier system as heretofore arranged, the supervisory signal in each channel is transmitted eight thousand times per second, whereas forty samples per second are all that are theoretically needed, and one or a few hundred would provide satisfactory without unduly complex circuit requirements. According to the invention, the signalling time slots in selected ones, or all of the channels, are shared to transmit on a time multiplexed basis both the needed signalling information and telegraph or data signals from plural independent sources. As shown and described herein, this may be done fairly simply and cheaply by the use of a ring counter and an array of AND gates.

DETAILED DESCRIPTION

A representative embodiment of the invention will now be described in detail in conjunction with the accompanying drawings, wherein.

Figure 1:
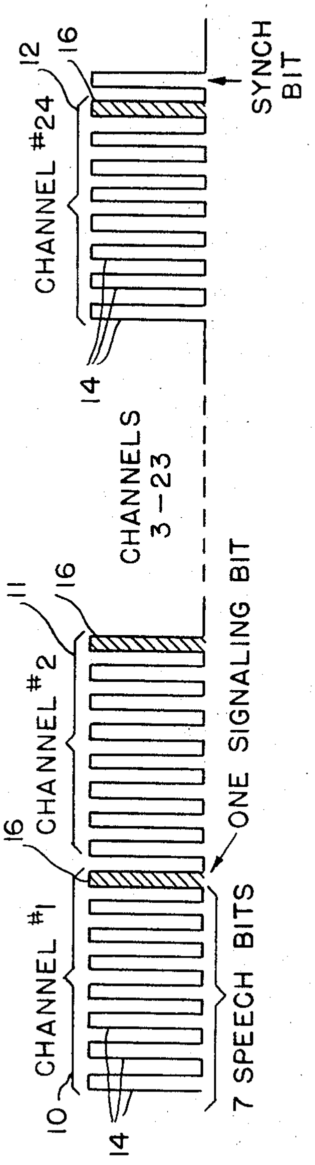
FIG. 1 is a schematic timing diagram of one time frame of a pulse train in a typical pulse code modulated system of the T-Carrier type.

A typical T-Carrier timing arrangement is illustrated in FIG. 1 and includes twenty-four time-spaced channels, three of which 10, 11, and 12 are illustrated. Seven time slots 14 in each of the channels are assigned to accept binary coded decimal signals for transmission of information representing the speech to be sent from one telephone to the other, and one time slot 16 is assigned to carry the supervisory signals. Ordinarily, only on-hook and off-hook information is carried in the signalling time slot 16. The maximum response actually required is only to follow the dial pulses, which may be represented by information at a rate of about twenty bits per second, or less. Thus, most of the signalling time slots in each channel may be used for other purposes without adversely affecting the transmission of all of the signals desired for telephone service. Moreover, the voice signal is not in any way affected.

Figure 2:
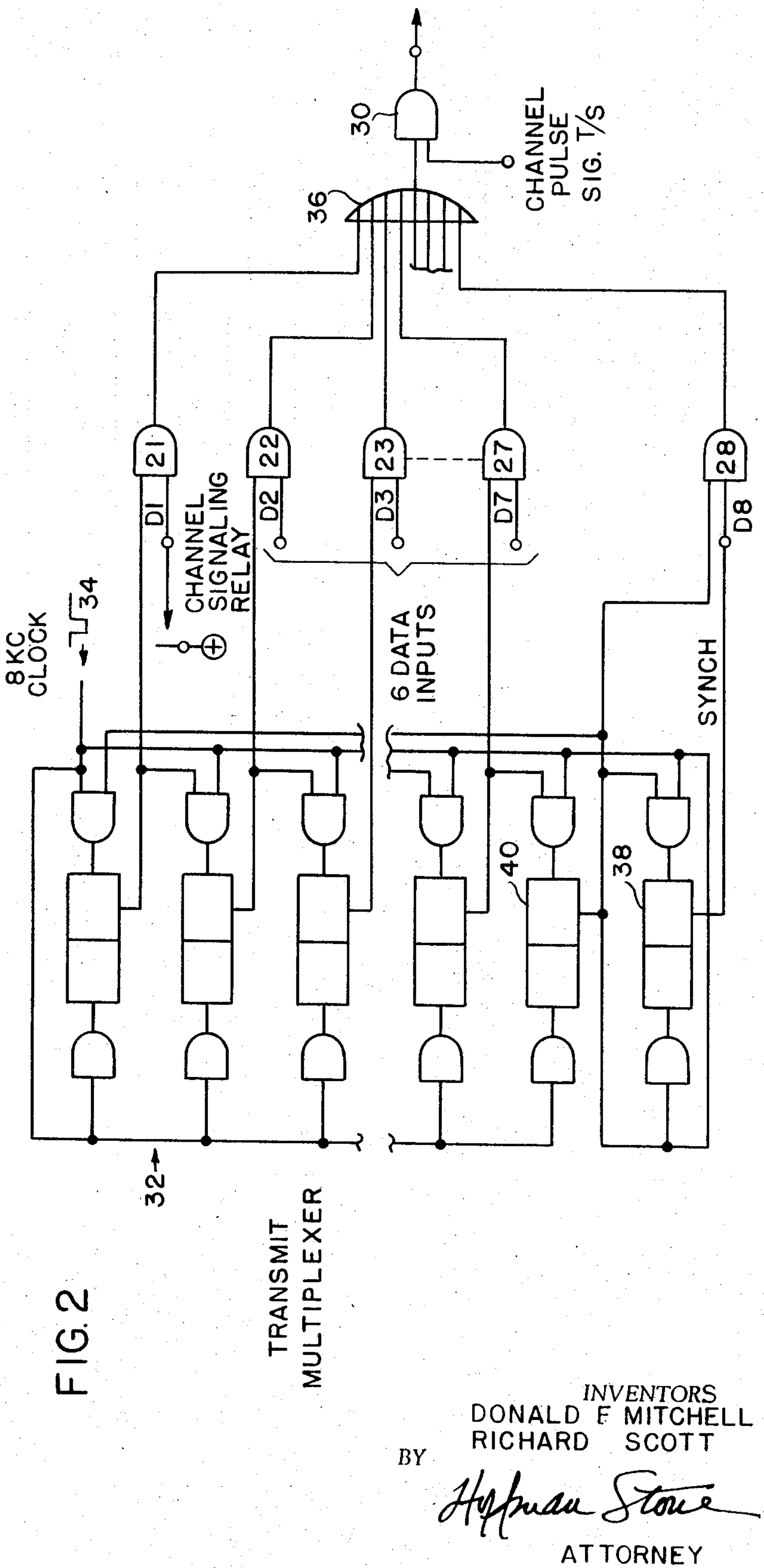
FIG. 2 is a schematic circuit diagram of an encoding arrangement according to the invention for multiplexing six telegraph or data channels in a single channel of the T-Carrier system.

This time sharing may be accomplished in any desired way such as by the circuit shown in FIG. 2, which is designed to be connected at the transmitter for inserting the multiplexed data into the pulse train at the appropriate times. Basically, the circuit includes an array of AND gates 21–28 connected between various input terminals D1–D8, that receive the signals to be transmitted, and the normal signalling bit input gate 30 in the T-Carrier modulator (not shown). The AND gates 21–28 are normally inhibited and are enabled in sequence once during each time frame of the T-Carrier system, by a ring counter 32, which steps once each time frame in response to the 8 kHz. clock pulses from the T-Carrier system.

The number of AND gates 21–28 is selected to accommodate the number of data channels to be multiplexed. There is one of the gates 21–28 for each data channel, plus one for the signalling information in the telephone channel, and one for a synchronizing signal to keep the distributor at the receiver properly timed with relation to the multiplexer at the transmitter. For the six data channels illustratively indicated in the drawing, the gates are eight in number. The outputs of the AND gates 21–28 are fed through a common OR gate 36 to the gate 30 at the input of the modulator (not shown), which is enabled only during the signalling time slot of the particular channel to which the multiplexing system is assigned. The gate 30 is controlled by the conventional T-Carrier circuitry, which need not be described herein.

In operation, as will readily be seen, the AND gates 21–28 are enabled in sequence during different successive time frames of the PCM transmitting system. During the first frame, for example, only the first gate 21 is enabled, and the supervisory signal from the terminal D1 is applied to the input AND gate 30 for insertion into the signalling time slot of the PCM channel. During the second time frame, only the second gate 22 is enabled, and the signal from the first data channel D2 is applied to the input AND gate 30 for insertion into the signalling time slot 16 during the second frame, and so on.

During the eighth time frame, a synchronizing signal is inserted into the signalling time slot from an auxiliary flip-flop 38, which is alternately set and reset by successive output signals from the eighth flip-flop 40 in the ring counter. Thus, the signalling time slots in alternate eighth time frames of the PCM system carry different respective types of signals, which are recognized at the receiver to synchronize the distribution of the signals with the multiplexing scheme.

Figure 3:
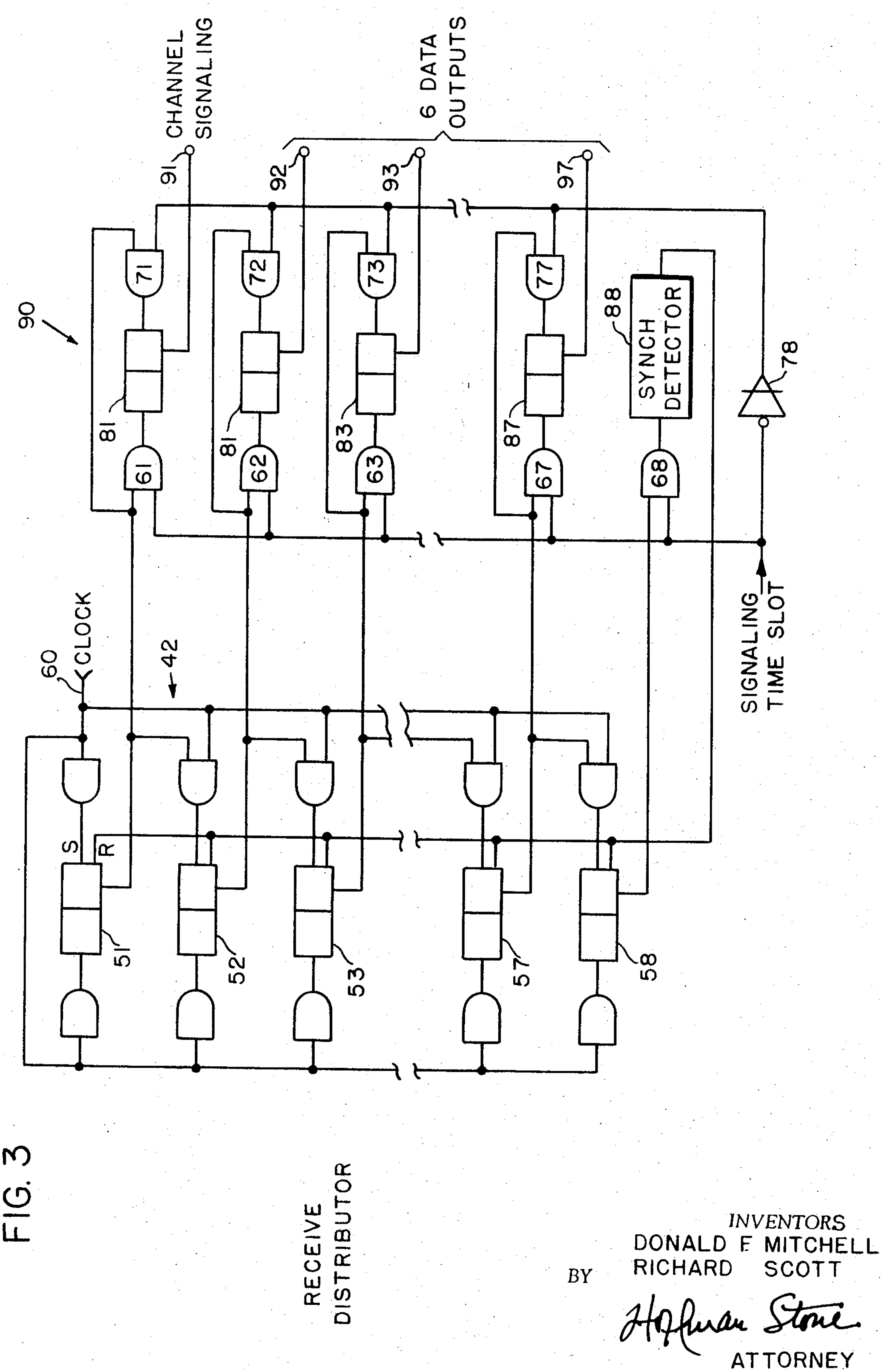
FIG. 3 is a schematic circuit diagram of the corresponding decoding, or de-multiplexing arrangement at the receiver.

The distributor at the receiver, as shown in FIG. 3, includes a ring counter 42, which may be identical to the ring counter 32 (FIG. 2) at the transmitter, and includes a set of eight sequentially connected flip-flops 51–58. The counter 42 is driven by the eight thousand pulses per second clock at the receiver, which is applied at the drive terminal 60. The outputs of the counter 42 are applied partially to enable respective AND gates 61–68 and 71–77. The outputs of the first seven 61–67 of the first group of gates are connected to the SET terminals of an array of seven flip-flops 81–87, and the outputs of the second group of gates 71–77 are connected to the RESET terminals of the flip-flops 81–87. The flip-flops 81–87 constitute an output register generally designated 90. The signals appearing in the signalling time slot 16 of the selected channel are applied to all of the second inputs of the first group of AND gates 61–68. The signals are also fed through an invertor 78 to the second inputs of the second group of AND gates 71–77. The output of the eighth flip-flop 58 in the ring counter is applied to one input of the last AND gate 68 of the first group, the output of which is applied to a detector 88 for synchronizing the ring counter 42 at the receiver with the ring counter 32 at the transmitter.

In operation, the flip-flops 81–87, of the output register are selectively set and re-set during different successive time frames of the PCM system in accordance with the signals in successive ones of the signalling time slots 16 of the multiplexed channel. The output of the first flip-flop 81 indicates the signalling information, and appears at an output terminal 91. The outputs of the other flip-flops indicate the data signals, and appear at different respective output terminals 92–97.

The detector 88 operates in accordance with conventional principles to step the counter 42 periodically until a signal component of characteristic frequency equal to one-half the recycling rate of the counter 42 appears at the output of the AND gate 68. So long as that signal component persists, the detector 88 holds the ring counter "locked in" phase and applies a RESET signal to all of the stages of the ring counter 42 on alternate successive cycles of the counter.

Thus, all of the signals carried by the signalling time slot are reconstituted at the outputs of the register 90, and are distributed to the desired output terminals 91–97. The accuracy of the reproduction is equal to one-half the recycling time of the ring counters 32 and 42, and there is an absolute time delay also equal to one-half the recycling time of the counters.

Any desired number of data channels may be multiplexed into the signalling time slots within the limits set by the permissible pulse width distortion, the desired speed of data transmission, and the duration of the time frame of the PCM system. In general, for any given number of data channels in the multiplexing scheme, the pulse width distortion varies directly as a linear function of the rate of the data signals. Transmission accuracy, in terms of maximum pulse width distortion of the data signals, may be expressed as the rate of the data signals divided by twice the sampling rate per data channel. Thus, in the system as hereinabove described, with six data channels, each sampled one thousand times per second, the distortion at fifty bits (twenty-five pulses) per second in one channel would be ±2.5%; at one hundred bits per second, it would be ±5%; and at the usual maximum rate for ordinary telegraph and teletypewriter signals of one hundred fifty bits per second, the distortion would be ±7½%. If, in the system as described, fourteen data channels were multiplexed, each channel would be sampled only five hundred times per second, and the accuracy figures would be ±5%, ±10%, and ±15%, respectively.

What is claimed is:

1. A speech-plus-data multiplex arrangement for a PCM signalling system of the type in which time slots are arranged in a repetitive time frame, certain ones of the time slots are assigned to carry signals indicative of speech signals to be transmitted, and other ones of the time slots are assigned to carry supervisory signals, said multiplex arrangement comprising means for inserting signals from plural sources into a selected one of the other time slots in respective different successive time frames, means at the receiving end for distributing signals from said other time slots among plural output terminals, and means for synchronizing the operation of said distributing means with the operation of said inserting means.

References Cited

UNITED STATES PATENTS 3,341,660 9/1967 Duerdoth ---------- 179—15

RALPH D. BLAKESLEE, Primary Examiner